No. 882,382. PATENTED MAR. 17, 1908.
R. T. HAINES.
SPEED INDICATOR.
APPLICATION FILED APR. 29, 1907.
2 SHEETS—SHEET 1.
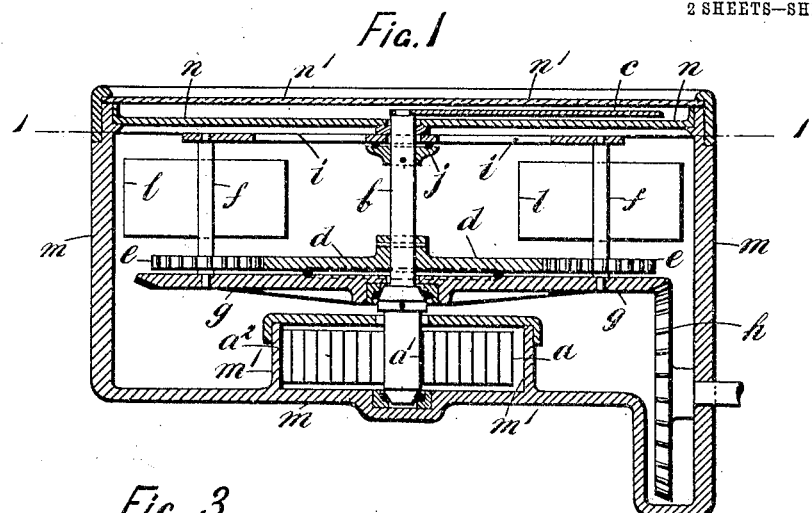
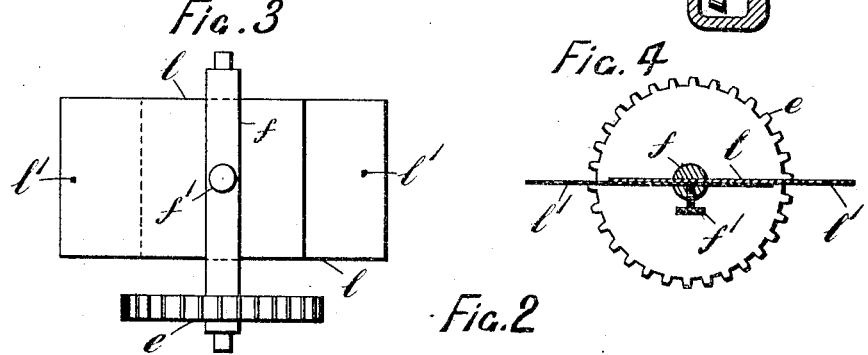
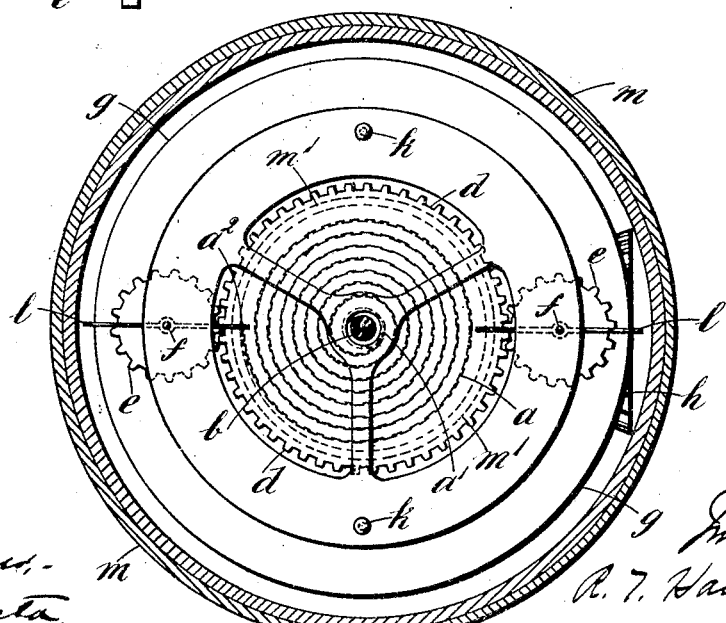

No. 882,382. PATENTED MAR. 17, 1908.
R. T. HAINES.
SPEED INDICATOR.
APPLICATION FILED APR. 29, 1907.

2 SHEETS—SHEET 2.

UNITED STATES PATENT OFFICE.

ROBERT THORN HAINES, OF LONDON, ENGLAND.

SPEED-INDICATOR.

No. 882,382.

Specification of Letters Patent.   Patented March 17, 1908.

Application filed April 29, 1907. Serial No. 371,006.

*To all whom it may concern:*

Be it known that I, ROBERT THORN HAINES, a subject of the King of Great Britain, of 26 Osnaburgh street, Regent's Park, London, in the county of Middlesex, England, have invented an Improved Speed-Indicator, of which the following is a specification.

The object of my invention is to provide a better and more effective means for automatically ascertaining and indicating the actual speed at which a car or vehicle of any kind is traveling, and of ascertaining and indicating the speed or velocity of revolving wheel shafts and all kinds of machinery in motion.

All speed indicators and devices for registering and recording actual speed or velocity hitherto devised and with which I am acquainted are more or less uncertain in action owing to the fact that they do not depend in their operation so far as I am aware upon any certain definite mechanical action or principle.

My invention is based upon the fact that it is possible to wind and unwind a spring in such a manner that the ratio of winding and unwinding is proportionally varied with the increase or decrease of speed so as to indicate definitely the exact increase or decrease of speed or velocity.

The present invention consists essentially of a spring arranged so as to be wound by mechanism operated by the vehicle or machinery and released or allowed to be unwound by its own strength in operating other mechanism so governed or regulated that it will be operated faster or slower according to the increased or decreased strength of the spring. The strength of the spring will be thus altered in exact proportion to the increase or decrease of speed and so indicate by the aid of a pointer attached to it upon a dial the exact speed or velocity.

It will be seen that it is the altered position of the spring due to the differences in the winding and unwinding which in turn, is according to the increase or decrease of speed which I utilize to indicate the velocity.

When the parts are properly regulated the ratio of winding and unwinding are exactly proportioned and vary with the increase or decrease of speed. Further the alteration of the position of the spring in consequence is in exact proportion to the increase or decrease of speed.

In order that my invention may be better understood I will now describe it with reference to the accompanying drawings which illustrate two practical methods of carrying it into effect.

Figure 5:
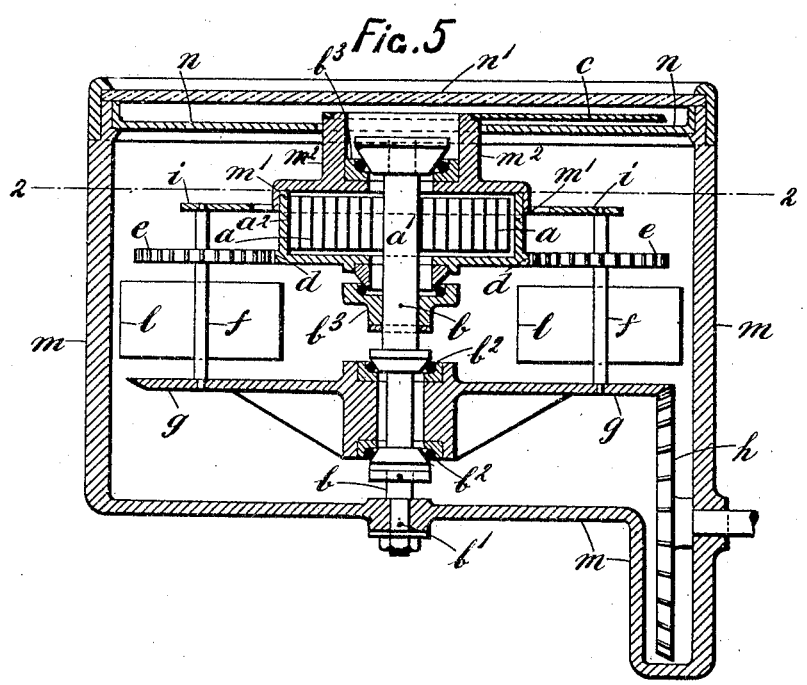
Figure 6:
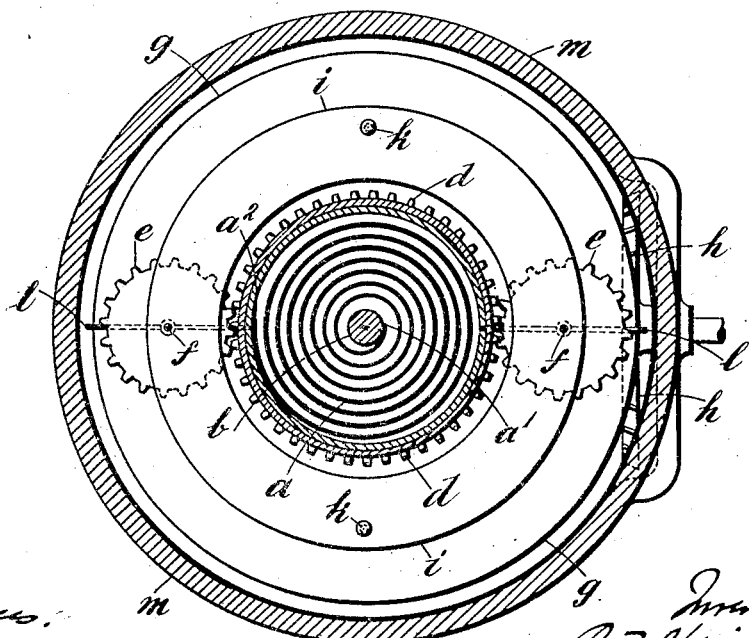

Figure 1 is a central vertical section through a speed indicator constructed in accordance with my invention: Fig. 2 is a sectional plan on the line 1—1 in the preceding figure. Fig. 3 is an elevation of a modified or adjustable form of fan or flier hereinafter more fully described: and Fig. 4 is a sectional plan view of the fan shown in Fig. 3. Fig. 5 is a similar view to Fig. 1 of a modified form of my invention: and Fig. 6 is a sectional plan, on the line 2—2, in Fig. 5.

Like letters of reference indicate the same or similar parts in the various figures.

In carrying out my invention as shown in Figs. 1 and 2 of the accompanying drawings, I provide a coil spring $a$ having its center end $a'$ attached to a pivot or spindle $b$. On one end, the upper, of this pivot $b$ I fix a pointer $c$, and near the other end, the lower, is fixed a toothed wheel $d$. This toothed wheel $d$ is geared to one or more small toothed wheels $e, e$, which are rigidly secured to spindles $f, f$, carried on the upper face of a large toothed wheel $g$ revolving freely about the aforesaid spindle $b$ upon a ball bearing. The toothed wheel $g$ is geared with a second wheel $h$ which is driven from any convenient part of the vehicle or other mechanism and operated by it.

I preferably support the upper ends of the spindles $f, f,$ revolubly in a loose frame or ring $i$ supported at its center upon a ball-bearing $j$ and adapted to rotate freely about the spindle $b$. Pillars or supports $k, k,$ are fitted where necessary to insure rigid connection between the wheel $g$ and the frame $i$. Fans or fliers $l, l,$ are fixed to the spindles $f, f,$ for regulating or breaking the speed of rotation of the wheels $e, e$. All these wheels and parts are carried in an outer case $m$ having a dial $n$ on the top cover protected by a glass or other transparent shield $n'$, between which and the dial the pointer $c$ travels. To this case $m$, or to an annular and concentric part or casing $m'$ formed integrally therewith the other end of the spring $a$ is fixed. It will thus be seen that one end of the spring $a$ is fixed to the pointer shaft $b$ and the other to the case $m$.

In order to provide better adjustment for the fans or fliers $l, l,$ I preferably make them in the form shown by Figs. 3 and 4 from which it will be seen that each fan $l$ is made in two parts $l'$, $l'$ adapted to be moved over each other towards, or away from, the axis of the spindle $f$ and retained firmly at the desired distance therefrom by means of a set screw $f'$, so that the area of the fan may be increased or decreased as desired.

The operation of the whole train of parts is as follows:—When the vehicle travels, or the machinery is set in motion, the wheel $h$ which is geared to the large toothed wheel $g$ causes the latter to turn and carries with it on its upper surface the small toothed wheels $e$, $e$, which revolve by reason of being geared into the other center fixed wheel $d$. But instead of being allowed to revolve freely the wheels $e$, $e$ are checked or retarded in their speed by the governor-like action of the fan blades $l$, $l$—so that they exert a pressure on the center wheel $d$ to which they are geared and carry that wheel round with them, and also the shaft $b$ and pointer $c$ attached thereto against the action of the spring $a$. That is to say, if the wheels $e$ did not turn on their shafts or spindles $f$, the wheel $d$ would be driven by a rigid connection from the wheel $h$, there would be no slip in the transmission of motion between the wheel $h$ and the wheel $d$, and the spring $a$ would soon be completely tensioned by being completely wound up, or completely unwound, as the case may be. On the other hand, if the wheels $e$, $e$, turned on their spindles $f$, absolutely without opposition, or friction, from their fans, then they would rotate around the said wheel $d$ as a track, the slip would be 100 per cent. and the spring $a$ would not be either wound or unwound at all. If, however, the fans $l$ meet with a resistance from the air, as they do in fact, then this resistance will cause a slip in the transmission of power from the wheel $h$ to the wheel $d$, which will decrease as the resistance is greater, and therefore it will depend upon the speed of the wheel $h$. Again, the tension of the spring $a$ opposing the action of the wheel $h$ through the wheels $e$ increases this slip. Furthermore, the spring's action on the wheels $e$ increases rapidly as the said spring is wound, so that in actual operation, as the wheel $h$ tensions the said spring, the slip rapidly decreases, with an increase in the speed of the wheel $h$, and rapidly increases with a decrease in the speed of said wheel $h$ and therefore a change in speed will turn the wheel $d$ and with it the pointer $c$, in such a direction and through such an angle as will accurately indicate such new speed.

In the somewhat modified form of my invention illustrated by Figs. 5 and 6, $a$ is the coil spring attached at its center $a'$ to the spindle $b$ which in this instance is rigidly secured at $b'$ to the casing $m$. The other end of the spring $a$ is attached to a casing $m'$ which carries upon an extension $m^2$ thereof, as shown, a pointer $c$. Near the lower end of the spindle $b$ is arranged a large toothed wheel $g$ adapted to revolve between ball bearings $b^2$, $b^2$, and to this wheel is geared the toothed wheel $h$ above described. The toothed wheel $g$ carries upon its upper surface the spindles $f$, $f$, which support the fans $l$, $l$, and to which are fixed small toothed wheels $e$, $e$, in gear with the toothed wheel $d$ in this instance formed integrally with the spring casing $m'$ which is revolubly mounted about the spindle $b$ between ball bearings $b^3$, $b^3$. $i$ is a ring frame for retaining the spindles $f,f$, and pillars $k$, $k$ in their vertical positions. The toothed wheel $d$ on the spring casing $m'$ being in gear with the small wheels $e$, $e$, which are carried round by the wheel $g$ in turn meshing with the wheel $h$ is operated thereby in opposition to the spring $a$ as above explained. It may be here pointed out that in this form of my invention one end of the spindle $a$ is fixed to the case $m'$ which supports the pointer shaft $b$ and the other end is attached to said shaft $b$; or, in other words, the spring $a$ is wound up about a fixed center instead of being wound round a revolving center as described in reference to Figs. 1 and 2. The operation of this form of my invention will be readily understood without further explanation, and it will be seen that as the wheel or gear $h$ is driven at a greater speed the correspondingly increased speed of the fans $l$, $l$ tend to compress the spring $a$ and the pointer $c$ will thus be moved in a relatively proportional degree as said spring is retarded. When the speed of the car or other mechanism is reduced the pressure of the spring in opposition to the fans will return the pointer to a normal position. Furthermore it will be understood that it requires a greater strength of spring to turn the small wheels $e$, $e$, more rapidly, and that said strength is increased as the velocity of the vehicle or mechanism itself increases, thus the pointer is turned with the spring to the proper position of the dial to indicate the actual speed.

Having fully described my invention, what I desire to claim, and secure by Letters Patent, is:—

1. In a speed indicator the combination of a moving part driven at a speed proportional to the speed to be indicated, a spring, means actuated by said part and adapted to move in a given direction and thereby put said spring under tension, said means also actuated by said part against a resistance, and adapted to cause a slip in the transmission of power from said moving part to said spring, and an indicating means for showing the speed, substantially as described.

2. In a speed indicator the combination of a moving part, a spring, means actuated by said part in a given direction and thereby imparting a tension to said spring, said means also actuated by said part, but against a resistance, and adapted to cause a slip in the transmission of power between said moving part and said spring, means permitting said spring to aid in increasing said slip, and an indicating means for showing the speed, substantially as described.

3. In a speed indicator, the combination of a moving part, a pivot, a casing, a coil spring attached at its center to said pivot and at its outer end to a convenient part of the said casing, a pointer fixed to said pivot and adapted to be moved over a dial, a toothed wheel fixed to said pivot, a small toothed wheel in gear with said first mentioned wheel, a fan for controlling said small wheel, a large toothed wheel upon which said fan and small wheel are rotatably mounted and free to rotate about said pivot and in gear with said moving parts, whereby the combined efforts of said fan and said spring on said small wheel is opposed to the efforts of said moving part, and said indicator represents the difference of said efforts, substantially as described.

4. In a speed indicator the combination of a moving part, a spring, means actuated by said part in a given direction, and thereby tensioning said spring, a second means consisting of a fan, having two vanes adjustable to and from its axis, also actuated by said moving part in the same direction as said first means, and adapted to create a slip to lessen the effect of said first means on said spring, said spring adapted to lessen said slip in an increasing ratio, and a dial and pointer for indicating the speed at which the machine is running, substantially as described.

In witness whereof I have hereunto set my hand in the presence of two witnesses.

ROBERT THORN HAINES.

Witnesses:
ALFRED T. BRATTON,
ALEX. H. FAVERSCH.